(12) United States Patent
Nomura et al.

(10) Patent No.: US 7,534,493 B2
(45) Date of Patent: *May 19, 2009

(54) GAS-BARRIERING COATED FILM

(75) Inventors: Takeshi Nomura, Kanagawa (JP); Takeshi Koyama, Kanagawa (JP)

(73) Assignee: Mitsubishi Gas Chemical Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/455,244

(22) Filed: Jun. 19, 2006

(65) Prior Publication Data

US 2007/0003768 A1 Jan. 4, 2007

Related U.S. Application Data

(63) Continuation of application No. 10/765,924, filed on Jan. 29, 2004, now abandoned.

(30) Foreign Application Priority Data

Jan. 29, 2003 (JP) ............................... 2003-20168

(51) Int. Cl.
*B32B 27/40* (2006.01)
(52) U.S. Cl. .............. 428/423.1; 428/423.5; 428/423.7; 428/424.8; 428/425.5
(58) Field of Classification Search .............. 428/423.1, 428/423.5, 423.7, 424.8, 425.5; 528/60, 528/64, 78, 79
See application file for complete search history.

(56) References Cited

U.S. PATENT DOCUMENTS

| | | | | |
|---|---|---|---|---|
| 4,408,034 | A * | 10/1983 | Kazama et al. | ............... 528/54 |
| 6,569,533 | B1 * | 5/2003 | Uchida et al. | ............ 428/423.1 |
| 6,887,966 | B2 * | 5/2005 | Nomura et al. | ............... 528/78 |

| | | | | |
|---|---|---|---|---|
| 2003/0229194 | A1 * | 12/2003 | Nomura et al. | ............... 528/59 |

FOREIGN PATENT DOCUMENTS

| | | |
|---|---|---|
| EP | 1 081 170 | 3/2001 |
| EP | 1081170 A2 | 3/2001 |
| EP | 1 396 443 | 12/2003 |
| JP | 58204018 A | 11/1983 |

OTHER PUBLICATIONS

Communication and European Search Report Mailed May 3, 2004, for EP No. EP 04 00 1642.

* cited by examiner

*Primary Examiner*—Thao T. Tran
(74) *Attorney, Agent, or Firm*—Antonelli, Terry, Stout & Kraus, LLP.

(57) ABSTRACT

Provided is a gas-barriering coated film obtained by coating a gas barriering layer on at least one face of a flexible film or an inorganic-deposited polymer film, wherein the above gas-barriering layer is a polyurethane resin-cured material formed from a composition comprising an active hydrogen-containing compound (A) and an organic polyisocyanate compound (B), and 20% by weight or more of a skeletal structure represented by Formula (1) is contained in the above resin-cured material. The gas-barriering coated film of the present invention is excellent in various performances such as a layer-to-layer adhesive property, a gas barriering property at a high humidity, a bending resistance and a retort treating resistance in addition to a high gas barriering property, and therefore it is applied to various uses including packing materials for food and medicines to which a high gas barriering property is required.

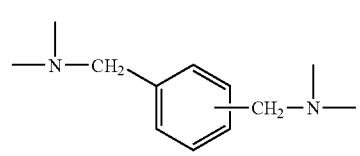

(1)

10 Claims, No Drawings

GAS-BARRIERING COATED FILM

This application is a Continuation application of application Ser. No. 10/765,924, filed Jan. 29, 2004, now abandoned the contents of which are incorporated herein by reference in their entirety.

BACKGROUND OF THE INVENTION

1. Field of the Invention

The present invention relates to a non-halogen base gas-barriering coated film suitably used for packing materials for foods and medicines for the purpose of preserving the contents by cutting off various gases such as oxygen, steam and fragrant components.

2. Description of the Related Art

In recent years, plastic films, sheets and the molded and processed products thereof are mainly used for packing materials for the purpose of preserving the contents because of transparency, light weight and economical efficiency. Performances required to plastic films used for packing foods, medicines and cosmetics include a barriering property against various gases, a transparency, a retort treating resistance, a bending resistance, a flexibility and a heat sealing property, and the high barriering property against oxygen and steam is particularly required for the purpose of preserving a performance and a quality of the contents.

In general, a gas barriering property of plastic films is not high so much, and a method in which a polyvinylidene chloride (PVDC) resin is coated has so far mainly been used as means for providing these films with a gas barriering property. However, it is regarded as a problem that a PVDC-coated film prepared by this method contains a halogen atom and therefore generates hazardous gas such as dioxin in incinerating, which is likely to cause environmental rupture.

Known as an alternative technique for this are an ethylene vinyl acetate copolymer-saponified product (EVOF resin) film, a polyvinyl alcohol (PVA)-coated film and an inorganic-deposited film obtained by depositing silica and alumina on a flexible polymer film. However, the EVOH resin film and the PVA-coated film have the problem that if they are exposed to moisture at a high humidity or subjected to boiling treatment or retort treatment, an oxygen barriering property is notably reduced, and the inorganic-deposited film has the problem that since a gas barriering layer is formed by depositing a hard inorganic compound, cracks and pinholes are produced on the gas barriering layer by bending and markedly lower the gas barriering property. Further, such vacuum deposition film requires a large-scaled production facility as compared with those in a coated film and laminated film, and it becomes expensive in terms of a production cost.

On the other hand, coating by a polyurethane resin having a gas barriering property and a gas barriering film having this resin layer are disclosed as a non-halogen base coating technique in an official gazette of Japanese Patent Application Laid-Open No. 98047/2001. However, this polyurethane resin layer does not have an adhesive property between films and therefore can not help being restricted to the same uses as those of gas-barriering film layers which have so far been used. Accordingly, when a gas barriering property is required to packing materials, an adhesive has to be applied in coating a gas barriering layer on a conventional film, so that a laminated film is disadvantageous in terms of a production cost. Further, a film prepared by applying an adhesive is increased in a thickness since an adhesive layer is added to a coating layer, and therefore an influence exerted on the environment by an increase in waste which is regarded as a problem in recent years is inevitably concerned about. Accordingly, a gas-barriering coated film in which a gas barriering performance is compatible with an adhesive performance is strongly desired to be developed in a packing material from the viewpoint of both of the cost and the environment.

An object of the present invention is to provide a non-halogen base gas-barriering coated film which solves the problems described above and has an excellent gas barriering property.

SUMMARY OF THE INVENTION

Intensive investigations repeated by the present inventors in order to solve the problems described above have resulted in finding that a non-halogen base gas-barriering coated film which is excellent in various performances such as a gas barriering property, a transparency, a bending resistance and a retort treating resistance is obtained by coating a gas barriering layer formed from a coating material having a specific composition on a flexible polymer film or an inorganic-deposited polymer film which is a base material.

That is, the present invention relates to a gas-barriering coated film obtained by coating a gas barriering layer on at least one face of a flexible film or an inorganic-deposited polymer film, wherein the above gas barriering layer comprises a polyurethane resin-cured material formed from a composition comprising an active hydrogen-containing compound (A) and an organic polyisocyanate compound (B), and 20% by weight or more of a skeletal structure represented by Formula (1) is contained in the above resin-cured material:

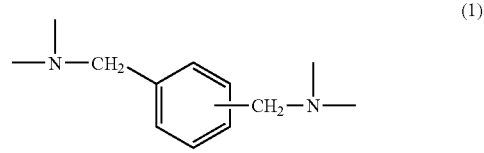

(1)

DESCRIPTION OF THE PREFERRED EMBODIMENTS

In the present invention, any materials can be used for the flexible polymer film or the inorganic-deposited polymer film which is a base material as long as they can be a base material which can hold the gas barriering layer (coated layer) formed from the composition comprising the active hydrogen-containing compound (A) and the organic polyisocyanate compound (B). Capable of being given as the examples of the flexible polymer film are, for example, polyolefin base films of ethylene and propylene, polyester base films of polyethylene terephthalate and polyethylene naphthalate, polyamide base films of nylon 6 and nylon 6,6, polyacryl base films, polystyrene base films, EVOH base films and PVA base films, and capable of being given as the examples of the inorganic-deposited polymer film are aluminum-deposited polyester base films, aluminum-deposited polyamide base films, aluminum oxide-deposited polyester base films, aluminum oxide-deposited polyamide base films, silicon oxide-deposited polyester base films, silicon oxide-deposited polyamide base films, aluminum oxide silicon oxide-binarily deposited polyester base films and aluminum oxide silicon oxide-binarily deposited polyamide base films. Among them, more preferred are polyolefin base films, polyester base films, polyamide base films, aluminum-deposited polyester base films, aluminum-deposited polyamide base films, aluminum oxide-deposited polyester base films, aluminum oxide-deposited polyamide base films, silicon oxide-deposited polyester base films, silicon oxide-deposited polyamide base films, aluminum oxide silicon oxide-binarily deposited polyester base films and aluminum oxide silicon oxide-binarily deposited polyamide base films.

The polymer film which is the base material for the coated film of the present invention may be either of a single layer film comprising a film selected from the films described above and a multilayer film comprising a film selected from the films described above as an external layer. These films may be stretched in a monoaxial or biaxial direction, and a thickness thereof is practically 10 to 300 µm, preferably 10 to 200 µm. Further, the flexible polymer film and the inorganic-deposited polymer film which are provided with a coating may be subjected to various surface treatments such as flame treatment and corona discharge treatment so that the coated film which is a gas barriering layer having no defects such as layer breaking and cissing caused in coating a coating liquid is formed. Such treatments accelerate good adhesion of the gas barriering layer onto the flexible polymer film and the inorganic-deposited polymer film.

The gas barriering layer in the present invention is characterized by containing 20% by weight or more of the skeletal structure represented by Formula (1) in the polyurethane resin-cured material formed from the composition described above. The high gas barriering property and the good adhesive property onto the base material are revealed by containing the skeletal structure represented by Formula (1) in the polyurethane resin-cured material at a high level.

The active hydrogen-containing compound (A) and the organic polyisocyanate compound (B) shall be explained below. At least one of the active hydrogen-containing compound (A) and the organic polyisocyanate compound (B) preferably contains a compound which can form the skeletal structure represented by Formula (1) by reacting (A) with (B).

<Active Hydrogen-containing Compound (A)>

In the present invention, at lest one compound selected from (i) an alkylene oxide adduct of polyamine, (ii) an amide group-containing alcohol, (iii) a polyol adduct of a polyisocyanate compound and (iv) a polyol is used as the active hydrogen-containing compound (A). These compounds may be any of the aliphatic compounds, the alicyclic compounds, the aromatic aliphatic compounds and the aromatic compounds and can suitably be selected according to the uses and the required performances in the uses. Considering the revelation of the higher gas barriering property and the better adhesive property onto the base material, the active hydrogen-containing compound having an aromatic part or an alicyclic part in a molecule is preferred, and the active hydrogen-containing compound which can form the skeletal structure represented by Formula (1) by reacting (A) with (B) is more preferred. Used is the active hydrogen-containing compound which has an amino group and/or a hydroxyl group as a terminal functional group and in which the total number of active hydrogens contained in the compound is 2 or more, and considering the revelation of the high gas barriering property and the good adhesive property onto the base material, the total number of active hydrogens contained in the compound is preferably 3 or more, more preferably 4 or more.

Capable of being given as the examples of the polyamine in (i) the alkylene oxide compound of polyamine described above are aliphatic polyamines such as ethylenediamine, trimethylenediamine, tetramethylenediamine, pentamethylenediamine, hexamethylene-diamine, ethanolamine and propanolamine, alicyclic polyamines such as 1,3- or 1,4-bis(aminomethyl)cyclohexane, 4,4'-,2,4'- or 2,2'-dicyclohexylmethanediamine, isophoronediamine and norbornane-diamine, aromatic aliphatic polyamines such as m- or p-xylylenediamine, α, α, α', α'-tetramethyl-m-xylylenediamine and α, α, α', α'-tetramethyl-p-xylylenediamine and aromatic polyamines such as 2,4- or 2,6-tolylenediamine and 4,4'-,2,4'- or 2,2'-diaminodiphenylmethane.

Hydroxyalkylamides can be given as the examples of the amide group-containing alcohol of (ii).

Capable of being given as the examples of the polyisocyanate compound in (iii) the polyol adduct of the polyisocyanate compound described above are aromatic polyisocyanates such as m- or p-phenylenediisocyanate, 2,4- or 2,6-tolylenediisocyanate, 4,4'-,2,4'- or 2,2'-diphenylmetanediisocyanate, 4,4'-toluidinediisocyanate, 4,4'-diphenyletherdiisocyanate and 1,5- or 2,6-naphthalenediisocyanate, aromatic aliphatic polyisocyanates such as m- or p-xylylenediisocyanate, α, α, α', α'-tetramethyl-m-xylylenediisocyanate and α, α, α', α'-tetramethyl-p-xylylenediisocyanate, alicyclic polyisocyanates such as 1,3- or 1,4-cyclohexanediisocyanate, isophoronediisocyanate, 1,3- or 1,4-bis(isocyanatemethyl)cyclohexane, 4,4'-,2,4'- or 2,2'-dicyclo-hexylmethanediisocyanate and norbornanediisocyanate, aliphatic polyisocyanates such as hexamethylenediisocyanate and buret products, alohanate products, urethedione products and isocyanurate products of the aromatic polyisocyanates, the aromatic aliphatic polyisocyanates, the alicyclic polyisocyanates and the aliphatic polyisocyanates each described above.

Capable of being given as the examples of the polyol of (iv) described above are aliphatic polyols such as ethylene glycol, 1,2 or 1,3-propanediol, 1,3 or 1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, neopentyl glycol, glycerin, trimethylolpropane and pentaerythritol, alicyclic polyols such as 1,3 or 1,4-cyclohexanedimethanol and aromatic polyols such as m- or p-xylylene glycol.

The alkylene oxide adduct (i) of polyamine described above reveals a high gas barriering property and an adhesive property onto the base material how many carbon atoms alkylene oxide has, but considering the revelation of the higher gas barriering property and the better adhesive property, alkylene oxide has preferably 2 to 4 carbon atoms. Any reaction mole ratio of polyamine to alkylene oxide described above reveals the gas barriering property, but considering the revelation of the higher gas barriering property and the better adhesive property, the mole ratio ([alkylene oxide]/[polyamine]) falls preferably in a range of 2 to 16.

A method in which alkylene oxide is added to polyamine, which has so far been used in the present field, can be adopted as a reacting method for forming the alkylene oxide adduct (i) of the polyamine described above. The reaction can be carried out at a reacting temperature falling in a range of 20 to 150° C. according to the kind of the polyamine and the alkylene oxide. The resulting product can have various forms from a solid to a liquid at a room temperature according to the kind of the polyamine and the alkylene oxide.

Any of the polyols of (iv) described above may be used for the polyol added to the polyisocyanate compound of (iii) described above. Any reaction equivalent ratio reveals the high gas barriering property and the high adhesive property, but considering the revelation of the higher gas barriering property and the better adhesive property onto the base material, the equivalent ratio ([OH group in polyol]/[NCO group in polyisocyanate compound]) falls preferably in a range of 2 to 20. The reacting method shall not specifically be restricted in terms of an order of adding the structural components described above, and various methods which have so far been used in the present field can be adopted, wherein the whole amounts of the respective components are mixed in succession or at the same time or the polyisocyanate compound is suitably added again, if necessary, in the middle of the reaction. Further, an organic solvent can be used, if necessary, in the reaction. Capable being given as the examples of the organic solvent are toluene, xylene, ethyl acetate, butyl acetate, cellosolve acetate, acetone, methyl ethyl ketone, methyl isobutyl ketone, tetrahydrofuran, dimethylformamide and dimethylacetamide. These organic solvents can be used alone or in combination of two or more kinds thereof. Further, publicly known organic metal compounds (lead or tin compounds) and tertiary amines can be used, if necessary, as a reaction accelerating agent in the reaction. The reaction can be carried out at a reacting temperature falling in a range of 20 to 160° C. according to the kind of the polyisocyanate compound and the polyol. The resulting product can have various forms from a solid to a liquid at a room temperature according to the kind of the polyisocyanate compound and the polyol.

Further, the active hydrogen-containing compounds (A) described above can be used alone or in the form of a mixture in which they are mixed in a suitable proportion in order to enhance various performances such as a flexibility, an impact resistance and a humidity and heat resistance of the film.

The active hydrogen-containing compounds (A) described above is preferably an alkylene oxide adduct of an aromatic aliphatic polyamine, a polyol adduct of an aromatic aliphatic polyisocyanate compound and an aromatic aliphatic polyol considering the revelation of the higher gas barriering property and the better adhesive property onto the base material, and it is more preferably an alkylene oxide adduct of an aromatic aliphatic polyamine.

<Organic Polyisocyanate Compound (B)>

In the present invention, a compound which is a reaction product of the following compounds (a) and (b) or a reaction product of the following compounds (a), (b) and (c) and which has two or more NCO groups at an end is used as the organic polyisocyanate compound (B):
(a) a multifunctional isocyanate compound,
(b) at least one multifunctional alcohol selected from multifunctional alcohols having 2 to 10 carbon atoms and
(c) at least one compound selected from aromatic multifunctional amines, aromatic aliphatic multifunctional amines, alicyclic multifunctional amines, aliphatic multifunctional amines, aliphatic alkanolamines, aromatic multifunctional carboxylic acids, alicyclic multifunctional carboxylic acids and aliphatic multifunctional carboxylic acids.

They may be any of the aliphatic compounds, the alicyclic compounds, the aromatic aliphatic compounds and the aromatic compounds and can suitably be selected according to the uses and the performances required in the uses. However, considering the revelation of the higher gas barriering property and the better adhesive property onto the base material, the organic polyisocyanate compound having an aromatic part and an alicyclic part in a molecule is preferred, and the compound which can form the skeletal structure represented by Formula (1) described above by reacting (A) with (B) is more preferred. Any reaction equivalent ratio of the components (a) and (b) or the components (a), (b) and (c) reveals the high gas barriering property and the high adhesive property, but considering the revelation of the higher gas barriering property and the better adhesive property onto the base material, the equivalent ratio ([component (a)]/[component (b)] or [component (a)]/[component (b)+[component (c)] is preferably 2 to 30.

A reacting method for forming the organic polyisocyanate compound (B) shall not specifically be restricted in terms of an order of adding the structural components described above, and various methods which have so far been used in the present field can be adopted, wherein the whole amounts of the respective components are mixed in succession or at the same time or the multifunctional isocyanate compound is suitably added again, if necessary, in the middle of the reaction. Further, an organic solvent can be used, if necessary, in the reaction. Capable being given as the examples of the organic solvent are toluene, xylene, ethyl acetate, butyl acetate, cellosolve acetate, acetone, methyl ethyl ketone, methyl isobutyl ketone, tetrahydrofuran, dimethylformamide and dimethylacetamide. These organic solvents can be used alone or in combination of two or more kinds thereof. Further, publicly known organic metal compounds (lead or tin compounds) and tertiary amines can be used, if necessary, as a reaction-accelerating agent. The reaction can be carried out at a reacting temperature falling in a range of 20 to 200° C. according to the kind of the components (a), (b) and (c). The resulting product can have various forms from a solid to a liquid at a room temperature according to the kind of the components (a), (b) and (c). If the excess unreacted component (a) is present in the reaction product of (a) and (b) or the reaction product of (a), (b) and (c), it can be removed from the reaction product by an existing method such as thin film distillation and extraction.

Capable of being given as the examples of the multifunctional isocyanate compound which is the component (a) are aromatic multifunctional isocyanate compounds such as m- or p-phenylenediisocyanate, 2,4- or 2,6-tolylenediisocyanate, 4,4'-,2,4'- or 2,2'-diphenylmetanediisocyanate, 4,4'-toluidinediisocyanate, 4,4'-diphenyletherdiisocyanate and 1,5- or 2,6-naphthalenediisocyanate, aromatic aliphatic multifunctional isocyanates such as m- or p-xylylenediisocyanate, α, α, α', α'-tetramethyl-m-xylylenediisocyanate and α, α, α', α'-tetramethyl-p-xylylenediisocyanate, alicyclic multifunctional isocyanates such as 1,3- or 1,4-cyclohexane-diisocyanate, isophoronediisocyanate, 1,3- or 1,4-bis(isocyanatemethyl)cyclohexane, 4,4'-,2,4'- or 2,2'-dicyclohexylmethanediisocyanate and norbornanediisocyanate, aliphatic multifunctional isocyanates such as hexamethylenediisocyanate and buret products, alohanate products, urethodione products and isocyanurate products of the aromatic multifunctional isocyanate compounds, the aromatic aliphatic multifunctional isocyanate compounds, the alicyclic multifunctional isocyanate compounds and the aliphatic multifunctional isocyanate compounds each described above. The multifunctional isocyanate compounds can suitably be selected alone or in combination of two or more kinds thereof according to the uses and the performances required in the uses.

The component (b) is at least one multifunctional alcohol selected from multifunctional alcohols having 2 to 10 carbon atoms, and they can suitably be selected alone or in combination of two or more kinds thereof according to the uses and the performances required in the uses. Capable being given as the examples of the multifunctional alcohol are aliphatic polyols such as ethylene glycol, 1,2 or 1,3-propanediol, 1,3 or 1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, neopentyl glycol, glycerin, trimethylolpropane and pentaerythritol, alicyclic polyols such as 1,3 or 1,4-cyclohexanedimethanol and aromatic polyols such as m- or p-xylylene glycol.

The component (c) is at least one compound selected from aromatic multifunctional amines, aromatic aliphatic multifunctional amines, alicyclic multifunctional amines, aliphatic multifunctional amines, aliphatic alkanolamines, aromatic multifunctional carboxylic acids, alicyclic multifunctional carboxylic acids and aliphatic multifunctional carboxylic acids, and they can suitably be selected alone or in combination of two or more kinds thereof according to the uses and the performances required in the uses.

2,4- or 2,6-Tolylenediamine and 4,4'-,2,4'- or 2,2'-diaminodiphenylmetane can be given as the examples of the aromatic multifunctional amines described above; m- or p-xylylenediamine, α, α, α', α'-tetramethyl-m-xylylenediamine and α, α, α', α'-tetramethyl-p-xylylenediamine can be given as the examples of the aromatic aliphatic multifunctional amines; 1,3- or 1,4-bis(aminomethyl)cyclohexane, 4,4'-,2,4'- or 2,2'-dicyclohexylmethanediamine, isophoronediamine and norbornanediamine can be given as the examples of the alicyclic multifunctional amines; ethylenediamine, trimethylenediamine, tetramethylenediamine, pentamethylenediamine and hexamethylene-diamine can be given as the examples of the aliphatic multifunctional amines; and ethanolamine and propanolamine can be given as the examples of the aliphatic alkanolamines. Isophthalic acid, terephthalic acid, 2,6-naphthalenedicarboxlic acid, paraphenylenedicarboxlic acid and trimellitic acid can be given as the examples of the aromatic multifunctional carboxylic acids; 1,3-cyclohexanedicarboxlic acid and 1,4-cyclohexanedicarboxlic acid can be given as the examples of the alicyclic multifunctional carboxylic acids; and malonic acid, succinic acid, adipic acid, suberic acid, azelaic acid, sebacic acid and dodecanedionic acid can be given as the examples of the aliphatic multifunctional carboxylic acids.

In making use of the reaction product of (a) and (b) or the reaction product of (a), (b) and (c) as the organic polyisocyanate compound (B), the multifunctional isocyanate compound which is the component (a) is preferably at least one compound selected from xylylenediisocyanate and a buret product, an alohanate product, a urethodione product and an isocyanurate product which are compounds derived from xylylenediisocyanate considering the revelation of the higher gas barriering property and the better adhesive property, and it is more preferably xylylenediisocyanate.

<Gas Barriering Layer (Coated Layer)>

The coated layer forming the coated film of the present invention contains 20% by weight or more, preferably 25% by weight or more and more preferably 30% by weight or more of the skeletal structure represented by Formula (1) described above in the polyurethane resin-cured material formed from the composition described above. The high gas barriering property and the good adhesive property onto the base material can be revealed by containing 20% by weight or more of the skeletal structure represented by Formula (1) described above in the polyurethane resin-cured material.

In the present invention, a blending proportion of the active hydrogen-containing compound (A) and the organic polyisocyanate compound (B) in the composition described above may be a standard blending range used when preparing a polyurethane resin-cured material by the reaction of an active hydrogen-containing compound with an organic polyisocyanate compound. To be specific, a ratio of the number of an isocyanate group contained in the organic polyisocyanate compound (B) to the sum of the numbers of hydroxyl groups and amino groups contained in the active hydrogen-containing compound (A) falls in a range of 0.8 to 3.0, preferably 0.9 to 2.5.

In the present invention, since curing reaction proceeds if the active hydrogen-containing compound (A) and the organic polyisocyanate compound (B) coexist for long time, it is preferred to separate the polyurethane resin-cured matte-forming components containing them into two or more liquids in storing and mix these liquids immediately before using to form the composition described above. In mixing, various additives are added if necessary, and some kind of a suited organic solvent is added for dilution to prepare a coating liquid. The above coating liquid is coated on a flexible film or an inorganic-deposited polymer film, and then it is subjected, if necessary, to drying and heat treatments, whereby a coated film is formed. That is, the coating liquid is prepared in a concentration of the composition which is satisfactory for obtaining the polyurethane resin-cured material. This can be changed by selecting the staring materials, and a concentration of the composition in the coating liquid can take various states from a case where it is not diluted by a solvent to a case where it is diluted to a concentration of about 5% by weight by using some kind of a suited organic solvent. Similarly, the curing reaction temperature may be various from a room temperature to about 140° C. The organic solvent shall not specifically be restricted as long as it is inert to the reaction and includes, for example, aromatic hydrocarbons such as toluene and xylene, ketones such as acetone, methyl ethyl ketone and methyl isobutyl ketone, ethers such as tetrahydrofuran and dioxane, esters such as ethyl acetate and butyl acetate, nitriles such as acetonitrile and amides such as dimethylformamide and dimethylacetamide. These solvents can be used alone or in combination of two or more kinds thereof. In a urethane- and/or urea-reducing reaction, urethane-reducing catalysts such as an amine base catalyst, a tin base catalyst and a lead base catalyst can be used, if necessary, alone or in combination of two or more kinds thereof.

Further, in the present invention, the composition described above may be mixed, if necessary, with a thermosetting resin composition such as an epoxy base resin composition, a polyacryl base resin composition and a polyurethane base resin composition as long as the effects of the present invention are not damaged.

In the present invention, a wetting agent such as a silicon or acryl base compound may be added, if necessary, to the coating liquid described above in order to aid wetting on the surface in applying the coating liquid on various film materials. The suited wetting agent includes BYK331, BYK333, BYK348 and BYK381 which are available from BYK Chemie GmbH. When adding them, it is added in a range of 0.01 to 2.0% by weight based on the whole weight of the composition described above.

Further, in order to raise various performances such as a gas barriering property, an impact resistance and a heat resistance of the gas-barriering coated film of the present invention, an inorganic filler such as silica, alumina, mica, talc, aluminum flake and glass flake may be added to the coating liquid described above. Such inorganic filler is preferably plate type. They are added in a proportion falling preferably in arrange of 0.01 to 10.0% by weight based on the whole weight of the composition described above.

Further, a coupling agent such as a silane coupling agent and a titanium coupling agent may be added to the coating liquid in order to further improve an adhesive property of the gas barriering layer onto the polymer film. They are added in a proportion falling preferably in arrange of 0.01 to 5.0% by weight based on the whole weight of the composition described above.

In the present invention, any of usually used coating methods such as roll coating, spray coating, air knife coating, dipping and brush coating can be used as a coating method used in applying the coating liquid on the polymer film. Roll coating or spray coating is preferred. For example, conventional roll coating or spray technique and facilities for coating a curing coating material component can be applied thereto.

A thickness of the gas barriering layer obtained after applying the coating liquid on the polymer film, drying and subjecting to heat treatment is practically 0.1 to 100 μm, preferably 0.3 to 10 μm. If it is less than 0.1 μm, the gas barriering property is less likely to be exhibited, and on the other hand, if it exceeds 100 μm, unevenness is produced in a film thickness thereof.

In the present invention, at least one layer of a flexible polymer film, a paper layer of carton, a metal foil layer of aluminum and copper and an oxygen absorbing layer may further be laminated on the gas barriering layer when the gas-barriering coated film produced in the manner described above is used for uses in various packing materials. When producing the laminated film described above, any of methods for producing conventional laminated films such as dry laminate and extruding laminate can be used.

The gas-barriering coated film of the present invention is excellent in various performances such as a layer-to-layer adhesive property, a gas barriering property at a high humidity, a bending resistance and a retort treating resistance in addition to a high gas barriering property, and therefore it is applied to various uses including packing materials for food and medicines to which a high gas barriering property is required. Further, since a non-halogen base gas-barriering coating material is used for the gas-barriering coated film of the present invention, a load exerted on the environment is small.

EXAMPLES

The examples of the present invention shall be introduced below, but the present invention shall by no means be restricted by these examples.

The coated films in the examples and the comparative examples were evaluated by the following methods.

<Oxygen Permeability (ml/m$^2$ ·day·MPa)>

An oxygen permeability-measuring apparatus (OX-TRAN 10/50A, manufactured by Modern Control Co., ltd.) was used to measure an oxygen permeability of the coated film under the conditions of 23° C. and a relative humidity of 60%. Further, the oxygen permeability at a high humidity was measured under the respective conditions of 23° C. and a relative humidity of 90% and 100%.

<Steam Permeability (g/m$^2$ ·day)>

A method designated in JIS Z-0208 was used to measure a steam permeability of the coated film under the conditions of 40° C. and a relative humidity of 90%.

<Layer-to-layer Adhesive Property (g/15 mm)>

A linear low density polyethylene film (Lix; manufactured by Toyobo Co., Ltd.) having a thickness of 40 μm was adhered on the gas barriering layer of the coated film by means of a heat roller of 110° C. to prepare a test piece. A method designated in JIS K-6854 and a strip of the coated film having a laminated film width of 15 mm and a length of 20 cm were used to measure the layer-to-layer adhesive property at a peeling speed of 100 mm/minute by means of a T type peeling tester. A numerical value to which [f] is affixed as shown in Table 1 shows that the base material film has been broken before peeling, and the numerical value shows a fracture strength thereof.

<Oxygen Permeability (ml/m$^2$ ·day·MPa) After Retort Treatment>

A retort food autoclave (manufactured by Tomy Co., Ltd.) was used to subject the coated film to retort treatment at 121° C. for 30 minutes, and an oxygen permeability of the treated film was measured under the conditions of 23° C. and a relative humidity of 60%.

<Bending Resistance>

Oxygen permeability measured value (ml/m$^2$ ·day ·MPa) after bending five times A gelvor flex tester (manufactured by Rigaku Ind. Co., Ltd.) was used to measure an oxygen permeability of the coated film subjected to twisting of five times at 360 degrees under the conditions of 23° C. and a relative humidity of 60%.

<Active Hydrogen-containing Compound A>

A reactor was charged with 1 mole of meta-xylylenediamine. The temperature was elevated to 50° C. under nitrogen flow, and 4 mole of ethylene oxide was dropwise added in 5 hours. After finishing dropwise adding, the solution was stirred at 100° C. for 5 hours to obtain an active hydrogen-containing compound A. A concentration of a meta-xylylenediamine skeleton having the skeletal structure represented by Formula (1) is 42.3%.

<Active Hydrogen-Containing Compound B>

A reactor was charged with 1 mole of meta-xylylenediamine. The temperature was elevated to 50° C. under nitrogen flow, and 4 mole of propylene oxide was dropwise added in 5 hours. After finishing dropwise adding, the solution was stirred at 100° C. for 5 hours to obtain an active hydrogen-containing compound B. A concentration of a meta-xylylenediamine skeleton having the skeletal structure represented by Formula (1) is 35.8%.

<Active Hydrogen-containing Compound C>

A reactor was charged with 20 mole of ethylene glycol. The temperature was elevated to 80° C. under nitrogen flow, and 1 mole of meta-xylylenediisocyanate was dropwise added in one hour. After finishing dropwise adding, the solution was stirred at 80° C. for 2 hours, and then a thin film distilling apparatus of 0.03 m$^2$ was used to obtain an active hydrogen-containing compound C having a proportion of remaining ethylene glycol of 0.6% by weight on the conditions of a vacuum degree of 1.0 Torr (133Pa), a distilling temperature of 180° C. and a feeding rate of 5 g/minute. A concentration of a meta-xylylenediamine skeleton having the skeletal structure represented by Formula (1) is 38.8%.

<Active Hydrogen-containing Compound D>

An active hydrogen-containing compound D was synthesized by the same method as in the active hydrogen-containing compound C, except that 1,4-butanediol was used. A concentration of a meta-xylylenediamine skeleton having the skeletal structure represented by Formula (1) is 33.0%.

<Organic Polyisocyanate Compound a>

A reactor was charged with 4 mole of meta-xylylenediisocyanate. The temperature was elevated to 80° C. under nitrogen flow, and 1 mole of ethylene glycol was dropwise added in 2 hours. After finishing dropwise adding, the solution was stirred at 80° C. for 2 hours, and then the thin film distilling apparatus of 0.03 m$^2$ was used to obtain an organic polyisocyanate compound a having a proportion of remaining meta-xylylenediisocyanate of 0.8% by weight on the conditions of a vacuum degree of 1.0 Torr (133Pa), a distilling temperature of 180° C. and a feeding rate of 5 g/minute. A concentration of a meta-xylylene-diamine skeleton having the skeletal structure represented by Formula (1) is 61.0%.

<Organic Polyisocyanate Compound b>

A reactor was charged with 4 mole of meta-xylylenediisocyanate. The temperature was elevated to 80° C. under nitrogen flow, and 1 mole of diethylene glycol was dropwise added in 2 hours. After finishing dropwise adding, the solution was stirred at 80° C. for 2 hours, and then the thin film distilling apparatus of 0.03 m$^2$ was used to obtain an organic polyisocyanate compound b having a proportion of remaining meta-xylylenediisocyanate of 0.5% by weight on the conditions of a vacuum degree of 1.0 Torr (133Pa), a distilling temperature of 180° C. and a feeding rate of 5 g/minute. A concentration of a meta-xylylenediamine skeleton having the skeletal structure represented by Formula (1) is 60.5%.

<Organic Polyisocyanate Compound c>

A reactor was charged with 10 mole of meta-xylylenediisocyanate. The temperature was elevated to 80° C. under nitrogen flow, and 1 mole of glycerin was dropwise added in 5 hours. After finishing dropwise adding, the solution was stirred at 80° C. for 2 hours, and then the thin film distilling apparatus of 0.03 m$^2$ was used to obtain an organic polyisocyanate compound c having a proportion of remaining meta-xylylenediisocyanate of 1.0% by weight on the conditions of a vacuum degree of 1.0 Torr (133Pa), a distilling temperature of 180° C. and a feeding rate of 3 g/minute. A concentration of a meta-xylylenediamine skeleton having the skeletal structure represented by Formula (1) is 57.1%.

<Organic Polyisocyanate Compound d>

A reactor was charged with 1 mole of meta-xylylenediisocyanate. The temperature was elevated to 80° C. under nitrogen flow, and 10 mole of trimethylolpropane was dropwise added in 3 hours. After finishing dropwise adding, the solution was stirred at 80° C. for 2 hours, and then the thin film distilling apparatus of 0.03 m$^2$ was used to obtain an organic polyisocyanate compound d having a proportion of remaining meta-xylylenediisocyanate of 0.5% by weight on the conditions of a vacuum degree of 1.0 Torr (133Pa), a distilling temperature of 180° C. and a feeding rate of 5 g/minute. A concentration of a meta-xylylene-diamine skeleton having the skeletal structure represented by Formula (1) is 54.3%.

<Organic Polyisocyanate Compound e>

A reactor was charged with 6 mole of tolylenediisocyanate. The temperature was elevated to 80° C. under nitrogen flow, and 1 mole of trimethylolpropane was dropwise added in 3 hours. After finishing dropwise adding, the solution was stirred at 80° C. for 2 hours, and then the thin film distilling apparatus of 0.03 m$^2$ was used to obtain an organic polyisocyanate compound e having a proportion of remaining tolylenediisocyanate of 0.6% by weight on the conditions of a vacuum degree of 1.0 Torr, a distilling temperature of 180° C. and a feeding rate of 5 g/minute. A concentration of a meta-xylylenediamine skeleton having the skeletal structure represented by Formula (1) is 0%.

<Organic Polyisocyanate Compound f>

A reactor was charged with 3 mole of (isocyanatemethyl)-cyclohexane and 3 mole of meta-xylylenediisocyanate. The temperature was elevated to 80° C. under nitrogen flow, and 1 mole of trimethylolpropane was dropwise added in 3 hours. After finishing dropwise adding, the solution was stirred at 80° C. for 2 hours, and then the thin film distilling apparatus of 0.03 m$^2$ was used to obtain an organic polyisocyanate compound f having a proportion of the sum of remaining (isocyanatemethyl)cyclohexane and meta-xylylene-diisocyanate of 0.5% by weight on the conditions of a vacuum degree of 1.0 Torr (133Pa), a distilling temperature of 180° C. and a feeding rate of 5 g/minute. A concentration of a meta-xylylenediamine skeleton having the skeletal structure represented by Formula (1) is 26.7%.

In the following examples, <a content of the skeletal structure represented by Formula (1) in the gas barriering layer> is a value calculated from a concentration of a meta-xylylenediamine skeleton having the skeletal structure represented by Formula (1) in the active hydrogen-containing compound (A) and the organic polyisocyanate compound (B) and the respective use amounts thereof according to the following equation:

<content of the skeletal structure represented by Formula (1) in the gas barriering layer>=([use amount of active hydrogen-containing compound (A)×concentration of a meta-xylylenediamine skeleton having the skeletal structure represented by Formula (1) in (A)]+[use amount of organic polyisocyanate compound (B)×concentration of a meta-xylylenediamine skeleton having the skeletal structure represented by Formula (1) in (B)])/(use amount of (A)+use amount of (B))

Example 1

The active hydrogen-containing compound A 100 parts by weight was mixed with the organic polyisocyanate compound a 442 parts by weight, and a solid material concentration thereof was adjusted to a solid material concentration of 35% by weight using an acetone/ethyl acetate=1/0.3 solvent. An acryl base wetting agent (BYK381; manufactured by BYK Chemie GmbH) 0.02 part by weight was added thereto and stirred well to prepare a coating liquid. This coating liquid was coated on a stretched polypropylene film having a thickness of 20 μm (brand name: Pylene; manufactured by Toyobo Co., Ltd.) by means of a bar coated No. 6 and cured at 60° C. for one hour to thereby produce a coated film. The gas barriering layer had a thickness of about 3 μm. The coated film thus obtained was evaluated for an oxygen permeability, a steam permeability, a gas barriering property and a layer-to-layer adhesive property. The results thereof are shown in Table 1. A concentration of the skeletal structure represented by Formula (1) in the gas barriering layer was 57.5% by weight.

Example 2

A coated film was produced by the same method as in Example 1, except that the organic polyisocyanate compound b 481 parts by weight was substituted for the organic polyisocyanate compound a 342 parts by weight. The coated film thus obtained was evaluated in the same manner as in Example 1. The results thereof are shown in Table 1. A concentration of the skeletal structure represented by Formula (1) in the gas barriering layer was 57.3% by weight.

Example 3

A coated film was produced by the same method as in Example 1, except that the organic polyisocyanate compound c 387 parts by weight was substituted for the organic polyisocyanate compound a 342 parts by weight. The coated film thus obtained was evaluated in the same manner as in Example 1. The results thereof are shown in Table 1. A concentration of the skeletal structure represented by Formula (1) in the gas barriering layer was 54.1% by weight.

Example 4

A coated film was produced by the same method as in Example 1, except that the organic polyisocyanate compound d 429 parts by weight was substituted for the organic polyisocyanate compound a 342 parts by weight. The coated film thus obtained was evaluated in the same manner as in Example 1. The results thereof are shown in Table 1. A concentration of the skeletal structure represented by Formula (1) in the gas barriering layer was 52.0% by weight.

Example 5

A coated film was produced by the same method as in Example 1, except that the organic polyisocyanate compound f 452 parts by weight was substituted for the organic polyisocyanate compound a 342 parts by weight. The coated film thus obtained was evaluated in the same manner as in Example 1. The results thereof are shown in Table 1. A concentration of the skeletal structure represented by Formula (1) in the gas barriering layer was 29.5% by weight.

Example 6

A coated film was produced by the same method as in Example 1, except that the active -hydrogen-containing compound B 100 parts by weight was substituted for the active hydrogen-containing compound A 100 parts by weight and that an amount of the organic polyisocyanate compound a was changed to 395 parts by weight. The coated film thus obtained was evaluated in the same manner as in Example 1. The results thereof are shown in Table 1. A concentration of the skeletal structure represented by Formula (1) in the gas barriering layer was 55.9% by weight.

Example 7

A coated film was produced by the same method as in Example 1, except that the active hydrogen-containing compound C 100 parts by weight was substituted for the active hydrogen-containing compound A 100 parts by weight and that the organic polyisocyanate compound c 317 parts by weight was substituted for the organic polyisocyanate compound a 312 parts by weight. The coated film thus obtained was evaluated in the same manner as in Example 1. The results thereof are shown in Table 1. A concentration of the skeletal structure represented by Formula (1) in the gas barriering layer was 55.6% by weight.

Example 8

A coated film was produced by the same method as in Example 1, except that the active hydrogen-containing compound D 100 parts by weight was substituted for the active hydrogen-containing compound A 100 parts by weight and that the organic polyisocyanate compound d 267 parts by weight was substituted for the organic polyisocyanate compound a 342 parts by weight. The coated film thus obtained was evaluated in the same manner as in Example 1. The results thereof are shown in Table 1. A concentration of the skeletal structure represented by Formula (1) in the gas barriering layer was 48.5% by weight.

Example 9

A coated film was produced by the same method as in Example 1, except that the base material film was changed to a silicon oxide-deposited polyethylene terephthalate film having a thickness of 12 μm (Techbarrier; manufactured by Mitsubishi Chemical Kojin Packs Co., Ltd.). The coated film thus obtained was evaluated in the same manner as in Example 1. The results thereof are shown in Table 1.

Comparative Example 1

A PVDC-coated, stretched polypropylene (KOPP) film having a thickness of about 20 μm (Senecy KOP #1000; manufactured by Daicel Chemical Co., Ltd.) was evaluated in the same manner as in Example 1. The results thereof are shown in Table 1.

Comparative Example 2

A coated film was produced by the same method as in Example 1, except that the organic polyisocyanate compound e 418 parts by weight was substituted for the organic polyisocyanate compound a 342 parts by weight. The coated film thus obtained was evaluated in the same manner as in Example 1. A concentration of the skeletal structure represented by Formula (1) in the gas barriering layer was 11.5% by weight.

TABLE 1

| | Oxygen permeability ($ml/m^2 \cdot day \cdot MPa$) | Steam permeability ($g/m^2 \cdot day$) | Layer-to-layer adhesive property (g/15 mm) |
|---|---|---|---|
| Example 1 | 70 | 4 | 250f |
| Example 2 | 80 | 4 | 250f |
| Example 3 | 80 | 4 | 250f |
| Example 4 | 120 | 4 | 250f |
| Example 5 | 200 | 4 | 250f |
| Example 6 | 70 | 4 | 250f |
| Example 7 | 100 | 4 | 250f |
| Example 8 | 300 | 4 | 250f |
| Example 9 | 10 | 1 | 500f |
| Comparative Example 1 | 70 | 5 | Not measurable |
| Comparative Example 2 | 1200 | 10 | 50 | f: the base material film was broken

Example 10

The coating liquid used in Example 1 was prepared. This coating liquid was coated on an aluminum oxide-deposited polyethylene terephthalate film having a thickness of 12 μm (GL-AEH; manufactured by Toppan Print Co., Ltd.) used as the base material film by means of a bar coater No. 3, and it was cured at 60° C. for one hour, whereby a coated film was obtained. The gas barriering layer had a thickness of 0.5 μm. The coated film thus obtained was evaluated for an oxygen permeability and tested for a bending resistance. The results thereof are shown in Table 2.

Comparative Example 3

The aluminum oxide-deposited polyethylene terephthalate film having a thickness of 12 μm (GL-AEH; manufactured by Toppan Print Co., Ltd.) on which the gas barriering layer of the present invention was not coated was evaluated for an oxygen permeability and tested for a bending resistance. The results thereof are shown in Table 2.

TABLE 2

| | Urethane coating treatment | | Oxygen permeability | |
|---|---|---|---|---|
| | Treat | Coated film thickness (μm) | Oxygen permeability measured value | measured value after bending five times |
| Example 10 | Done | 0.5 | 10 | 20 |
| Comparative Example 3 | None | — | 25 | 100 |

The oxygen permeability in Table 2 shows the gas barriering property before and after the bending resistance test in the cases where the gas barriering layer of the present invention was coated (Example 10) and not coated (Comparative Example 3) on the inorganic-deposited film.

The inorganic-deposited film on which the gas barriering layer of the present invention was not coated (Comparative Example 3) was inferior in a bending resistance and reduced to ¼ in an oxygen barriering property after the bending resistance test. On the other hand, in the inorganic-deposited film (Example 10) which was subjected to urethane coating treatment using the coating liquid prepared in Example 1, the oxygen barriering property after the bending resistance test was reduced only to ½.

That is, the inorganic-deposited film is enhanced in a gas barriering property and improved in a bending resistance by coating the polyurethane base gas-barriering resin of the present invention. This is considered to be attributable to that the gas-barriering resin fills up small holes (pinholes) present in the inorganic-deposited layer and that the inorganic-deposited layer which is inferior in a bending resistance is guarded by the polyurethane base gas-barriering layer, and it is considered that a marked synergistic effect has been revealed by coating the coating liquid of the resent invention.

Example 11

The coated film prepared in Example 2 was evaluated for an oxygen permeability at a high humidity (relative humidity: 90% and 100%), a bending resistance (oxygen permeability after gelvor treatment) and an oxygen permeability after retort treatment. The results thereof are shown in Table 3.

Example 12

The film prepared in Example 3 was evaluated in the same manner as in Example 11. The results thereof are shown in Table 3.

Example 13

The film prepared in Example 9 was evaluated in the same manner as in Example 11. The results thereof are shown in Table 3.

Comparative Example 4

The film prepared in Comparative Example 1 was evaluated in the same manner as in Example 11. The results thereof are shown in Table 3.

Comparative Example 5

The silicon oxide-deposited polyethylene terephthalate film having a thickness of 12 μm (brand name: Techbarrier; manufactured by Mitsubishi Chemical Kojin Packs Co., Ltd.) was evaluated in the same manner as in Example 11. The results thereof are shown in Table 3.

Comparative Example 6

A PVA-coated OPP having a thickness of about 20 μm (brand name: Renbarrier; manufactured by Rengo-Co., Ltd.) was evaluated in the same manner as in Example 11. The results thereof are shown in Table 3.

TABLE 3

| | Oxygen permeability (ml/m² · day · MPa) | | | | |
|---|---|---|---|---|---|
| | 60% RH | 90% RH | 100% RH | After gelvor treatment | After retort treatment |
| Example 11 | 80 | 100 | 150 | 150 | 100 |
| Example 12 | 80 | 80 | 90 | 90 | 90 |
| Example 13 | 10 | 10 | 10 | 10 | 10 |
| Comparative Example 4 | 70 | 100 | 300 | >10000 | 110 |
| Comparative Example 5 | 30 | 40 | 150 | >10000 | 100 |
| Comparative Example 6 | 10 | >10000 | >10000 | >10000 | 1500 |

What is claimed is:

1. A gas-barriering coated film obtained by coating a gas barriering layer on at least one face of a flexible film or an inorganic-deposited polymer film, wherein said gas barriering layer comprises a polyurethane resin-cured material formed from a composition comprising an alkylene oxide adduct of xylylenediamine (A), an alkylene oxide of said alkylene oxide adduct of xylylenediamine having 2 to 4 carbon atoms, wherein a mole ratio of alkylene oxide to polyamine of the alkylene oxide adduct of xylylenediamine falls in a range of 4 to 16, and an organic polyisocyanate compound (B), said polyurethane resin-cured material being a reaction product of said alkylene oxide adduct of xylylenediamine (A) and said organic polyisocyanate compound (B), and 20% by weight or more of a skeletal structure represented by Formula (1) is contained in the above resin-cured material:

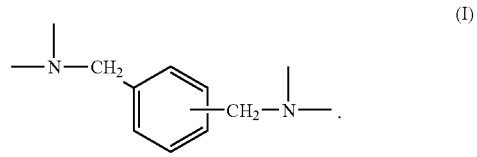

2. The gas-barriering coated film as described in claim 1, wherein at least one of said alkylene oxide adduct of xylylenediamine (A) and the organic polyisocyanate compound (B) contains a compound which can form the skeletal structure represented by Formula (1) by reacting (A) with (B).

3. The gas-barriering coated film as described in claim 1, wherein the organic polyisocyanate compound (B) is a reaction product of the following compounds (a) and (b) or a reaction product of the following compounds (a), (b) and (C) and has two or more NCO groups at an end:
 (a) a multifunctional isocyanate compound,
 (b) at least one multifunctional alcohol selected from multifunctional alcohols having 2 to 10 carbon atoms and (c) at least one compound selected from aromatic multifunctional amines,
aromatic aliphatic multifunctional amines, alicyclic multifunctional amines, aliphatic multifunctional amines, aliphatic alkanolamines, aromatic multifunctional carboxylic acids, alicyclic multifunctional carboxylic acids and aliphatic multifunctional carboxylic acids.

4. The gas-barriering coated film as described in claim 3, wherein the multifunctional isocyanate compound (a) described above is at least one compound selected from xylylenediisocyanate and a compound derived from xylylenediisocyanate.

5. The gas-barriering coated film as described in claim 4, wherein the multifunctional isocyanate compound is xylylenediisocyanate.

6. The gas-barriering coated film as described in claim 1, wherein the flexible polymer film or the inorganic-deposited polymer film is a film selected from polyolefin base films, polyester base films, polyamide base films, aluminum-deposited polyester base films, aluminum-deposited polyamide base films, aluminum oxide-deposited polyester base films, aluminum oxide-deposited polyamide base films, silicon oxide-deposited polyester base films, silicon oxide-deposited polyamide base films, aluminum oxide silicon oxide-binarily deposited polyester base films and aluminum oxide silicon oxide-binarily deposited polyamide base films.

7. The gas-barriering coated film as described in claim 2, wherein the organic polyisocyanate compound (B) is a reaction product of the following compounds (a) and (b) or a reaction product of the following compounds (a), (b) and (c) and has two or more NCO groups at an end:

(a) a multifunctional isocyanate compound;
(b) at least one multifunctional alcohol selected from multifunctional alcohols having 2 to 10 carbon atoms; and
(c) at least one compound selected from aromatic multifunctional amines,
aromatic aliphatic multifunctional amines, alicyclic multifunctional amines, aliphatic multifunctional amines, aliphatic alkanolamines, aromatic multifunctional carboxylic acids, alicyclic multifunctional carboxylic acids and aliphatic multifunctional carboxylic acids.

8. The gas-barriering coated film as described in claim 2, wherein the flexible polymer film or the inorganic-deposited polymer film is a film selected from polyolefin base films, polyester base films, polyamide base films, aluminum-deposited polyester base films, aluminum-deposited polyamide base films, aluminum oxide-deposited polyester base films, aluminum oxide-deposited polyamide base films, silicon oxide-deposited polyester base films, silicon oxide-deposited polyamide base films, aluminum oxide silicon oxide-binarily deposited polyester base films and aluminum oxide silicon oxide-binarily deposited polyamide base films.

9. The gas-barriering coated film as described in claim 1, wherein a ratio of number of isocyanate groups in the organic polyisocyanate compound (B) to sum of number of hydroxyl groups and amino groups in the alkylene oxide adduct of xylylenediamine (A) falls in a range of 0.8 to 3.0.

10. The gas-barriering coated film as described in claim 9, wherein said ratio of number of isocyanate groups in the organic polyisocyanate compound (B) to sum of number of hydroxyl groups and amino groups in the alkylene oxide adduct of xylylenediamine falls within a range of 0.9 to 2.5.

* * * * *